United States Patent Office 3,592,694
Patented July 13, 1971

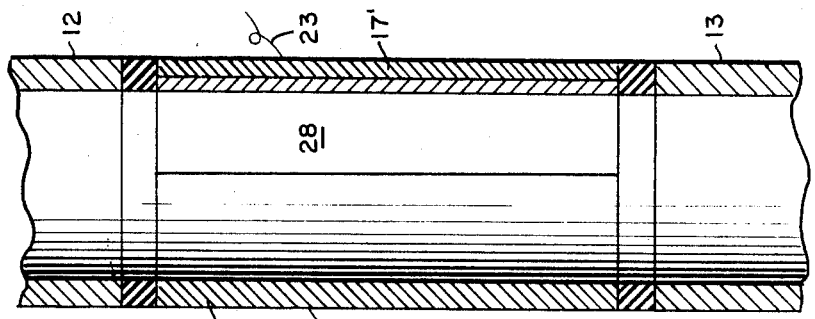
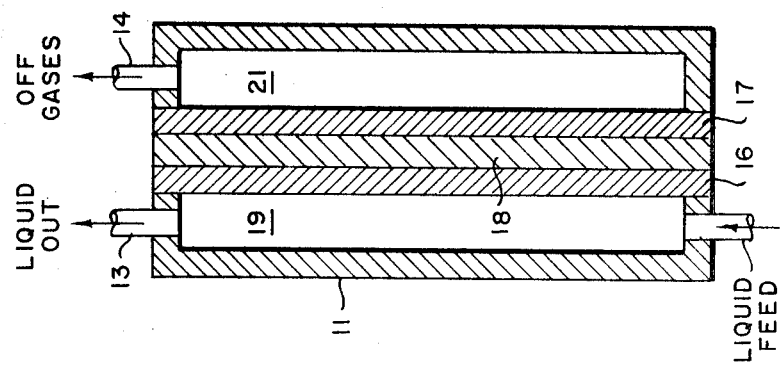
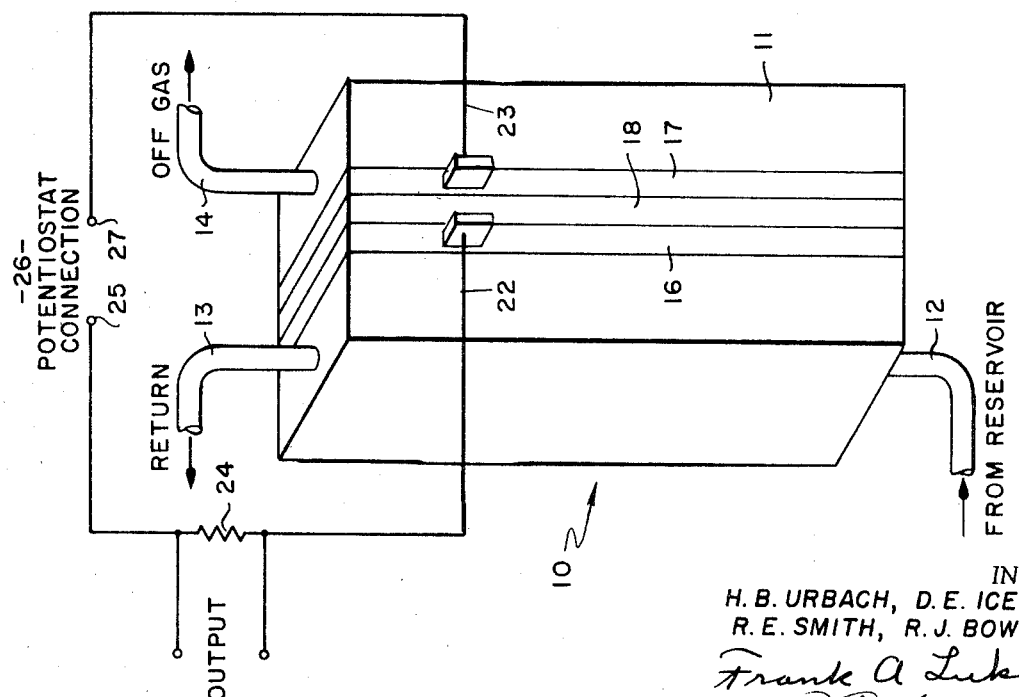

3,592,694
HYDRAZINE FUEL CELL CONTROL SYSTEM
Herman B. Urbach, Robert E. Smith, and Robert J. Bowen, Annapolis, and David E. Icenhower, Hillcrest Heights, Md., assignors to the United States of America as represented by the Secretary of the Navy
Filed Sept. 16, 1968, Ser. No. 760,049
Int. Cl. H01m 27/00, 27/02
U.S. Cl. 136—86
2 Claims

ABSTRACT OF THE DISCLOSURE

Apparatus for controlling hydrazine concentration in fuel cells. A hydrazine sensor comprises an elongated porous anode, guarded from the cathode by a porous separator to prevent cathode gas from contacting the anode. The current output of the sensor is fed into a comparator then into a hydrazine-feeding system which delivers fuel to the fuel cell.

The invention described herein may be manufactured and used by or for the Government of the United States of American for governmental purposes without the payment of any royalties thereon or therefor.

BACKGROUND OF THE INVENTION

The present invention relates generally to a hydrazine sensor and more particularly pertains to a hydrazine sensor for controlling hydrazine in fuel cells.

In the field or fuel cells, at least two hydrazine control system concepts for hydrazine fuel cells have been incorporated in prototype fue cell stacks. Some of the hydrazine control systems sense the actual level of hydrazine concentration, while others rely on symptomatic analysis of stack performance. In general, in the prior art devices, the control is intermittent in nature in that the sensing information is not proportional to the hydrazine concentration and the feed control is entirely on or off. Therefore, a controller based upon sensing elements yielding a proportional response to the level of hydrazine concentration is advantageous from the viewpoint of system stability and noise.

SUMMARY

The general purpose of this invention is to provide a hydrazine sensor that has all of the advantages of similarly employed sensors and none of the above-described disadvantages. To attain this, the present invention provides a unique principle of anodic oxidation of hydrazine and its decomposition products. If the anodic oxidation of the hydrazine is largely complete, the anodic current then becomes a linear measure of the hydrazine concentration. Non-linear response of current concentration may be eliminated by insuring sufficient residence time of the sample liquid in the vicinty of the anode so that oxdation is complete. The sensing element of the system is an elongated small hydrazine cell with a membrane to prevent cathode gas from contacting the anode. A fixed reference electrode (which may be the cathode) is employed as a reference potential source to compare with the potential of the anode. The electronic component which fixes the desired potential is a potentiostat. The current output of the sensor is compared with a desired value representative of some optimum hydrazine concentration. The output of the comparator is then fed into a hydrazine feeding system which delivers the fuel to the cell.

An oobject of the present invention is to provide an improved sensor employing novel electrodes.

A further object is to provide a hydrazine sensor of relatively inexpensive construction which provides an output response signal proportional to the hydrazine concentration.

Another object of the present invention is to provide a hydrazine sensor utilizing anodic oxidation of all hydrazine and its decomposition products.

A still further object is to provide a system whch is insensitive to contamination by impurities.

BRIEF DESCRIPTION OF THE DRAWING

The exact nature of this invention as well as other objects and advantages thereof will be readily apparent from consideration of the following specification relating to the annexed drawings in which:

FIG. 1 shows a schematic view of a sensing cell with piping and electrical connections.

FIG. 2 shows an exploded view of one form of a sensing cell according to this invention.

FIG. 3 shows a schematic view of another form of a sensing cell according to this invention.

DESCRIPTION OF THE PREFERRED EMBODIMENT

Figure 4:
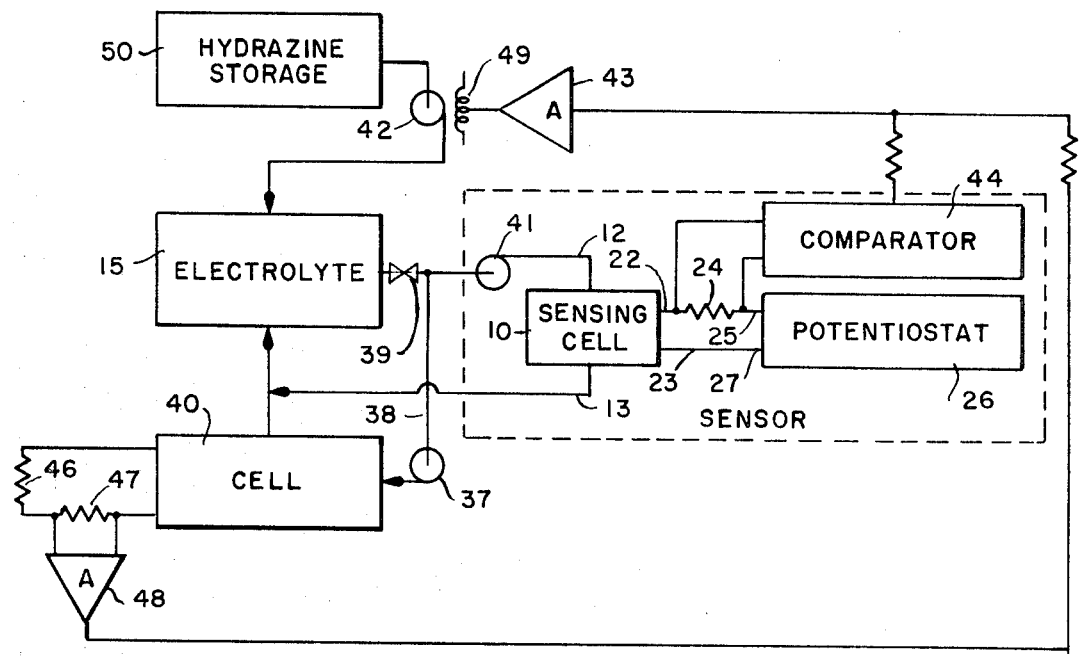
FIG. 4 shows the sensing cell in its mechanical and electrical configuration in a fuel cell system.

FIGS. 1 and 2, which illustrate a form of a sensing cell according to this invention, shows a sensing cell 10 comprising a casing 11 having liquid inlet means 12 and liquid outlet means 13 and 14. Liquid inlet means 12 and liquid outlet means 13 are connected to a reservoir 15 (shown in FIG. 4) containing a suitable hydrazine electrolyte fuel.

Disposed within casing 11 and in spaced relationship to each other, are first and second electrode members 16 and 17 and porous separator 18 which coact with each other and casing 11 to define therebetween two chambers 19 and 21.

Extending out from casing 11 are a pair of electrical leads 22 and 23. Lead 22 is connected to electrode 16, while lead 23 is connected to electrode 17. To form a complete circuit, lead 22 extends to and is connected through a suitable load, exemplified by resistance 24 to one terminal 25 of a potentiostat 26, while lead 23 is connected to terminal 27.

It is, of course, understood that for purposes of this description the illustrations of the cells and the elements therewith are predominantly schematic and are shown merely to exemplify the mechanics of the cell rather than to accurately reproduce either the quantities or the actual positions of the elements.

The first electrode member 16, the anode of this embodiment, may be an elongated porous structure, guarded from the second electrode member or cathode 17, by the porous separator 18 which minimizes cathodically evolved hydrogen from diffusing to the first electrode member 16. To expedite egress of electrodeposited gas from the surface of the second electrode member or cathode 17, the cathode may preferably be constructed of porous metal with wet-proofing agents to control bleeding of electrolyte into the phase-separating compartment, chamber 21 behind the member 17. Furthermore, the dimensions of the cell 10 may preferably be sized to deplete the hydrazine content of the incoming stream of electrolyte subject to realistic current densities. For example, at pumping rates in the range of 0.1 ml./min. with a 1.0 molar hydrazine-electrolyte mixture, the anode current is about 600 ma. and would require several square centimeters of surface to minimize problems associated with gas evolution and phase separation. Since it is difficult to obtain micro-pumping systems for stable, diminutive flow rates and since these stabilized flow rates are essential to the proper operation of the sensor of this invention, an alternative system which eliminates pumping may be used.

The embodiment in FIG. 3 differs from that in FIG. 2 in that the cell 10 with diffusion membrane 28 may be installed directly into the fuel-electrolyte line 12 from the reservoir 15. The membrane 28 is mounted substantially flush against the electrode member or cathode 17'. Hydrazine flowing through conduit 12 is forced to diffuse through membrane 28. Nitrogen gas which may develop on electrode 16' is back diffused through the membrane 28. The thickness of the membrane 28 may be increased to decrease the amount of consumed hydrazine at the expense of the response time of the device. Utilization of the diffusion membrane 28 permits placement of the second electrode member 17' in the fule-electrolyte line 12.

Figure 5:
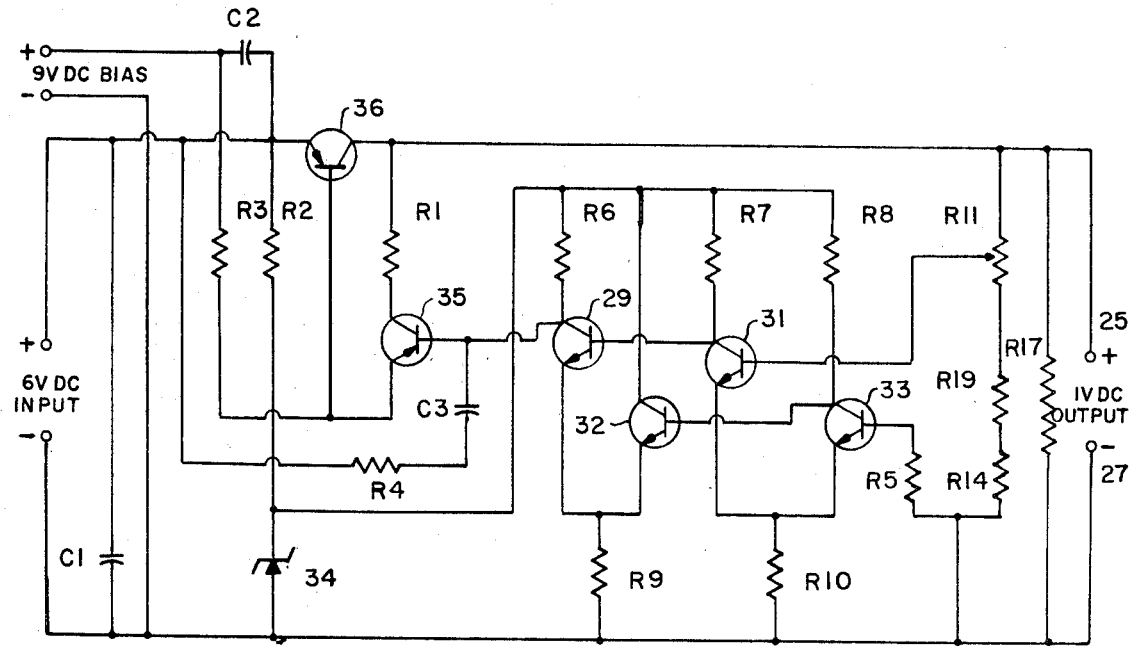
FIG. 5 is a schematic of a potentiostat in accordance with the invention.

The sensing cell 10, with or without a micropump, is connected electrically to the potentiostat 26 as shown in FIG. 4. The potentiostat 26 establishes a potential of approximately 1.0 v. (versus a reference hydrogen electrode (not shown) in the same electrolyte) on the anode electrode member 16 with relatively small fluctuation under changing current load. FIG. 5 shows a potentiostat which may preferably be used. Transistors 29, 31, 32 and 33 form a differential amplifier which amplifies the difference in the signal between the 1.0 volt DC output and the reference voltage of the Zener diode 34. Transistor 35 is a common-emitter amplifier and driver for the power restricter transistor 36 which is actually the final regulating component. Only a portion of the output signal as applied through resistor R11 is actually used by the differential amplifier.

Following is a listing of typical values of the circuit components which may be used in the example of a potentiostat 26 recited above. These values are intended to be exemplary of an operating embodiment of the invention and are not interpreted in a limiting sense since other values may be substituted to achieve satisfactory operation.

Transistors 29, 31, 32 and 33—2N 3414
Transistor 35—SK 3009
Transistor 36—2N 2156A
Diode 34—1N 4733
Capacitor C1—1000 μfd.–25 v. DC
Capacitor C2—220 μfd.–10 v. DC
Capacitor C3—.1 μfd.–400 v. DC
Resistor R1—10 ohms
Resistor R2—120 ohms
Resistor R3—360 ohms
Resistor R3—4700 ohms
Resistor R5—68.1 ohms
Resistor R6—10K ohms
Resistor R7—330 ohms
Resistor R8—330 ohms
Resistor R9—360 ohms
Resistor R1—1500 ohms
Resistor R11—50 ohms 2W Pot.
Resistor R12—33 ohms
Resistor R13—1 ohm 10W
Resistor R14—11.2 ohms

THEORY OF OPERATION

The system shown in FIG. 4 contains two distinct flow systems. Explanation of the system will first be described with relation to the liquid feed of an electrolyte or hydrazine flowing to the electrolyte reservoir 15. The second flow system described below is the current flow system.

Liquid electrolyte containing hydrazine, e.g. $N_2H_4 \cdot H_2O$ is pumped from reservoir 15 by means of a pump 37 through a conduit 38 containing valve 39 and into cell 40. The valve 39 also controls the input feed into micro pump 41 which delivers a sample of the hydrazine containing electrolyte into sensing cell 10. The fluid after passing through sensing cell 10 returns through conduit 13 into the hydrazine electrolyte reservoir 15 because it is depleted of hydrazine. As the hydrazine is consumed from the electrolyte in the reservoir 15, hydrazine is metered from hydrazine storage reservoir 50 by metering pump 42 into the hydrazine electrolyte reservoir 15. Amplified 43 provides the electrical control for the metered flow produced by metering pump 42.

The electrical flow system comprises the sensing cell 10 which examines the concentration of hydrazine coming into it as pumped by the micro pump 41. Sensing cell 10 provides an output signal which is directly proportional to the concentration of the electrolyte. A desirable concentration of the electrolyte is set manually or automatically by a control in comparator 44. The potentiostat 26 serves to hold the potential of the sensing cell 10 at some fixed value. The comparator 44 senses a voltage drop across resistor 24 which represents the current passing through resistor 24 which is proportional to the hydrazine concentration. The comparator 44 delivers a signal representing the deviation from some desirable hydrazine concentration to the power amplifier 43.

In addition, the fuel cell 40 provides electrical current to the load 46 and through a small meter shunt 47 which may be set at one millivolt. The voltage across the meter shunt 47 is fed into a load sensing amplifier 48. The load sensing amplifier 48 sends a signal, which is proportional to the voltage across shunt 47 and which is also proportional to the actual current delivered by the cell 40, to the power amplifier 43.

Thus there are two signals fed into the power amplifier 43. There is a signal representing the actual load delivered by the cell 40 and a signal representing the actual deviation from the desired concentration in reservoir 15. Although the load 46 may change very rapidly, the concentration in the sensing cell 10 will not change immediately because of finite amount of time is required for the concentration of the electrolyte to fall as a result of the consumption of the hydrazine under a larger load. Therefore it is desirable to have the load sensing amplifier respond instantaneously throughout the changes in load and concentration. Thus at the input to amplifier 43 there is a sensing signal which represents the load and a sensing signal which represents the actual deviation from the desired concentration. Both of these signals are amplified and fed into the motor which operates the metering pump 42.

EXAMPLE

In an example in accordance with the invention, the operation of the hydrazine anode in various polarization modes was studied in a glass system by the method of the triangular potential sweep. A Wenking Potentiostat was programmed with a Hewlett-Packard type 202A or 3300A Function Generator to produce triangular potential sweeps (.01 c.p.s.) on gold and platinum electrodes. The anode currents resulting from the imposed triangular potential sweep were recorded on a type 564 Tektronix storage oscilloscope.

Figure 6:
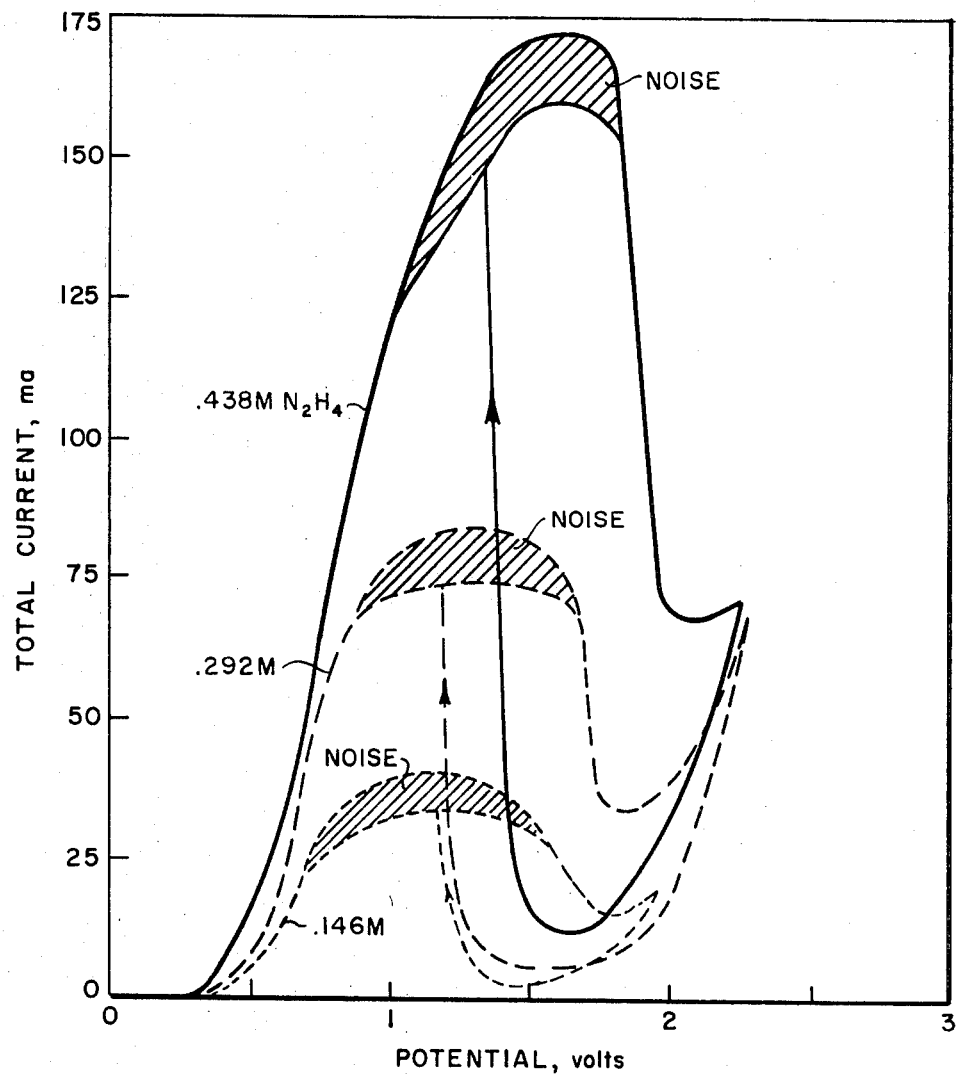
FIG. 6 shows triangular potential sweep traces on gold electrodes in the presence of hydrazine.
Figure 7:
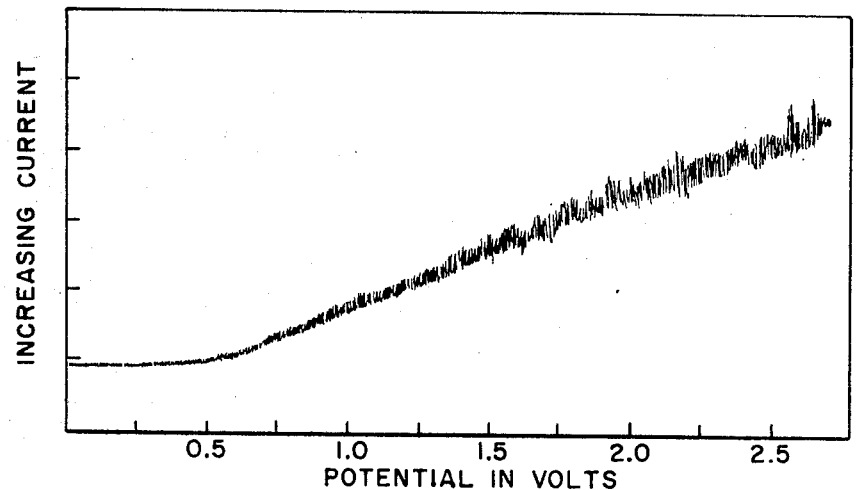
FIG. 7 shows triangular potential sweep traces below the diffusion limit on gold in the presence of hyrazine.

FIG. 6 shows triangular potential sweep diagrams obtained on gold wires. The anodic portion of the sweep is higher than the cathodic portion of the sweep which is low because of formation of oxide. The hydrazine diffusion limited currents are indicated by the noise-broadened trace (due to convective motions) at the top of wide current peaks. The hydrazine (Eastman 85%) was added to the electrolyte in 0.2 ml. portions. With each addition, the diffusion-limited current increased in non-linear relation i.e., 33, 76 and 160 ma. of total current for 0.146, 0.292 and 0.438 M hydrazine solutions. One may interpret the results in terms of increased convection caused by nitrogen bubble evolution and increased ohmic polarization error as a result of bubble occlusions. Whatever the explanation, the above results show that the diffusion limited region of anodic hydrazine oxidation reveals an unexpected non-linear concentration dependence at normal cell concentrations.

The response of the hydrazine anode to hydrazine concentration was examined in the kinetic region prior to the onset of the diffusion limit in the range between 3 and 7% hydrazine (1 and 2.3 molarity). According to FIG. 8 there is no discernible difference in the anodic current response for potential sweeps (.01 c.p.s.) on gold exposed to 3, 4, 5, 6 and 7% hydrazine. The lack of dependence of the anodic current on concentration becomes very noticeable above 1% (.33 M) hydrazine. It is, perhaps, reflected in the broad flat maximum in the performance-concentration curve of hydrazine fuel cells. That the anodic current response is independent of concentration in this concentration domain is also evident in the self-decomposition rate of hydrazine on platinum and palladium surfaces at the rest potential. The self-decomposition rate demonstrates a near zero order dependence on the hydrazine concentration in the range between 0.3 and 3 M. A similar behavior is noted in the anodic current response at high concentrations of many fuels such as methanol, where the accumulation of sluggish absorbed organic residues deactivates the electrode. Analogous explanation of the hydrazine system would suggest the buildup of nitrogen residues (hydrazides, diazides and tetrazides) on the surface of the hydrazine anode.

Considering the desirability of linear hydrazine sensing, two negative conclusions are indicated by the aforementioned data. The "diffusion-limited" region of hydrazine anode response is not linear in concentration. Nor is the kinetically-limited region of hydrazine anodes linear at least in the concentration ranges of normal operation between 0.3 and 2 M hydrazine. However, a positive result is indicated in the triangular potential sweep data of FIG. 6 in the fact that oxidation of the surface is not significant on gold electrodes below 1.2 v. On platinum electrodes the oxidation potential is certainly lower. Since it is essential to avoid oxidation of the surface which is equivalent to poisoning of the anodic activity, one must establish a maximum as well as minimum potential limit for each anode material.

Figure 8:
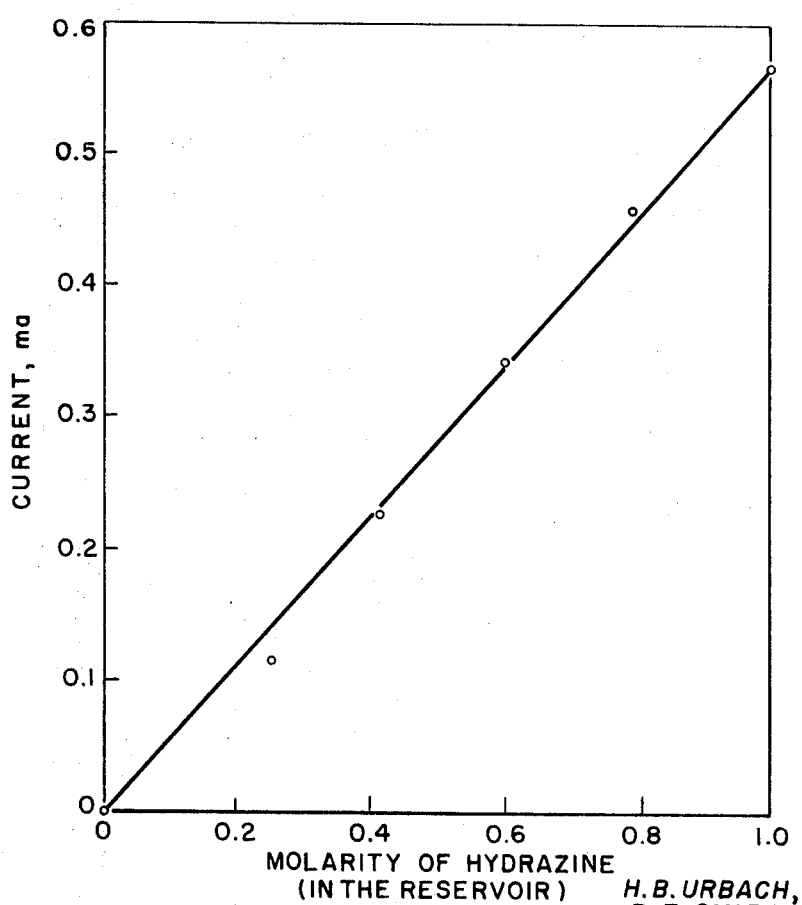
FIG. 8 shows the current response of a platinum black anode to hydrazine in the reservoir.

To achieve linear current response in the hydrazine anode two experimental approaches may be adopted. In one approach it was decided to increase the residence time of the sampled electrolyte in the sensing cell. Employing a sufficiently large residence time is equivalent to diluting the hydrazine to some low concentration range where response is linear. The results of such an experiment in vitro are shown in FIG. 8. The sampling reservoir was stocked with increasing concentrations of hydrazine which varied from 0.26 M to 1.0 M. With the anode at approximately 1.0 v. and with the sampling feed rate into the 40-ml. anolyte compartment at .132 ml./min., the response was essentially linear. The maximum current density was approximately 10 ma./cm.$^2$. However, the response time required to establish 90% of the steady state current was as long as 12 min. With moderate decrease in the size of the anolyte compartment, the response time may be reduced without entering the non-linear range of anode response.

A second approach involves the use of the porous membrane to establish a fixed diffusion rate of flow. The system is simpler because the micropump is unnecessary. The rate of diffusion in units of current is (1) $nFADC/d$ where: $n$ is the number of electrons transferred during the anodic oxidation of hydraznie; F is Faraday's constant; A the effective area of the membrane; D the equivalent diffusion coefficient; C the concentration of hydrazine in the bulk electrolyte; and $d$ the thickness of the membrane. The formula involves the assumption that the hydrazine concentration is essentially negligible at the anode interface or that the diffusion limited condition is maintained. Since bubble evolution is small and the anode potential is fixed substantially below potentails where oxidation of water or nitrogen can occur, non-linearity is avoided. Various degrees of diffusion limitation may be established, depending upon the thickness of the membrane. A thicker membrane sustains the diffusion-limited current at smaller values of current and power dissipation. However, the time necessary to propagate a concentration change (i.e., the time to achieve 90% of the steady-state change) is rapidly increased with membrane thickness.

Since the response time of the sensor is a measure of the stability of the system, it is desirable to minimize this quantity as much as possible. However, the most severe requirement with regard to feed rate is that produced by a sudden change in load. Since the concentration change produced by the load change requires a finite amount of time which is dependent upon the level of hydrazine concentration, the size of the fuel-electrolyte inventory, the feed rate and the load, some time may elapse before the sensor 10 indicates a response above the background noise of the system. To stabilize the fuel cell 40 response, the stable system must register response to load changes without waiting for concentration changes. The schematic shown in FIG. 5 represents such a system where a summing amplifier and an "and/or" network drive the hydrazine metering pump in proportion to either a concentration signal, or a load signal. The combination of these two proportional responses appear both necessary and sufficient for stable operation of a hydrazine fuel-cell system.

What is claimed is:

1. A system for controlling the concentration of hydrazine in a hydrazine-electrolyte fluid in fuel cells, the combination comprising:

a sensor cell adapted to contact the hydrazine-electrolyte fluid and adapted to generate an output signal linearly proportional to the hydrazine concentration in said fuel cells;

a potentiostat operably connected to said sensor cell and adapted to establish a substantially fixed reference voltage on said sensor cell;

a comparator adapted to provide an output signal which is a comparison of the ouput signal of said sensor cell and a desired value representative of an optimum concentration of hydrazine as established by the potentiostat;

a loading sensing amplifier for providing an output signal representing the output of said fuel cells; and a fuel feeding system adapted to be responsive to said comparator output signal and said load sensing amplifier output signal, said fuel feeding system adapted to meter said hydrazine and thereby maintain a desired concentration.

2. A system for controlling the concentration of hydrazine in a hydrazine-electrolyte fluid in fuel cells in accordance with claim 1 wherein said sensor cell comprises:

a casing adapted to form a chamber and adapted to permit substantially continuous fluid flow therethrough;

an anode disposed within said chamber, said anode adapted to consume the hydrazine in the hydrazine electrolyte fluid flowing through said chamber thereby producing an output signal which is a linear measurement of the hydrazine concentration in said fluid;

a cathode disposed within said chamber for providing a reference potential signal to compare with the output signal of said anode; and a separator disposed between said anode and said cathode and adapted to prevent contamination of said anode by gases evolving from said cathode.

References Cited

UNITED STATES PATENTS

| | | | |
|---|---|---|---|
| 3,098,769 | 7/1963 | Liebhafsky et al. | 136—86 |
| 3,318,736 | 5/1967 | Barber | 136—86 |
| 3,390,015 | 6/1968 | Wilson | 136—86 |
| 3,411,951 | 11/1968 | Gelting | 136—86 |
| 3,471,337 | 10/1969 | Fetterman | 136—86 |

GERALD L. KAPLAN, Primary Examiner